United States Patent
Itoh et al.

(10) Patent No.: US 8,224,088 B2
(45) Date of Patent: Jul. 17, 2012

(54) METHOD FOR BACKGROUND GENERATION AND ITS SYSTEM FOR VIDEO SURVEILLANCE

(75) Inventors: Masaya Itoh, Hitachi (JP); Hiromasa Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1374 days.

(21) Appl. No.: 11/514,099

(22) Filed: Sep. 1, 2006

(65) Prior Publication Data
US 2007/0047811 A1    Mar. 1, 2007

(30) Foreign Application Priority Data
Sep. 1, 2005    (JP) .................................. 2005-252958

(51) Int. Cl.
*G06K 9/34* (2006.01)
(52) U.S. Cl. ......................... 382/173; 382/103; 348/170
(58) Field of Classification Search .................. 382/130, 382/173, 103; 348/170
See application file for complete search history.

(56) References Cited

U.S. PATENT DOCUMENTS

| | | | |
|---|---|---|---|
| 2004/0081335 A1* | 4/2004 | Kondo et al. | 382/107 |
| 2004/0239762 A1* | 12/2004 | Porikli et al. | 348/169 |
| 2005/0104958 A1* | 5/2005 | Egnal et al. | 348/143 |

FOREIGN PATENT DOCUMENTS

| JP | 09-081714 | 3/1997 |
|---|---|---|
| JP | 2005-184419 | 7/2005 |

* cited by examiner

*Primary Examiner* — Claire X Wang
*Assistant Examiner* — Michael Vanchy, Jr.
(74) *Attorney, Agent, or Firm* — Antonelli, Terry, Stout & Kraus, LLP.

(57) ABSTRACT

A background generating method of low process cost for use in detecting a moving object based on subtraction process performed between an input image and a base image, and an apparatus with the function of detecting a moving object using its background. The apparatus consists of a feature vector extractor for calculating feature vectors from the input image and an average processor capable of obtaining an average from the calculated feature vectors, diminishing noise occurring for a short time and the influence by the moving object, and forming images that follows the illumination change due to changes in the imaging environment. The images generated by the average processor are accumulated for a predetermined number of frames and the accumulated images are statistically processed by a statistical processor.

23 Claims, 4 Drawing Sheets

METHOD FOR BACKGROUND GENERATION AND ITS SYSTEM FOR VIDEO SURVEILLANCE

BACKGROUND OF THE INVENTION

This invention relates to image processing where appearing and vanishing objects are detected in input images, and more particularly to a method, an apparatus and a video surveillance system for generating backgrounds.

A conventional method for detecting a moving object such as a car or a person in input images obtained by means of a video input apparatus such as a fixedly installed video camera, has widely employed the subtraction method where moving objects are detected by comparing a base image for reference with an input image. According to the conventional method, either an input image taken before a particular input image in input video sequence is chosen as the base image for the particular input image, or a separately prepared background is chosen as the base image.

In these methods for detecting moving objects based on the subtractive processing of the input image and the base image, if the subtraction process is performed using the base image selected from among any previous input images, a "false positive" may be caused when the previous input image contains a moving object therein. In such an image environment as security surveillance or intelligent transport system (ITS) where traffic flow is relatively heavy, the selection of input image which contains no moving object is very difficult. Moreover, in such an imaging environment, illumination often and easily varies due to weather change. Accordingly, there may arise a possibility of causing a "false positive" or a "false negative" unless the base image can follow up the time-sequential change in the imaging environment.

A method for generating a background which contains no moving object and which can follow up the changing image environment, is disclosed in, for example, JP-A-9-81714, wherein the background is produced by using a recursive filter in such a manner that a plurality of image sequence (time-sequential images) containing moving objects or illumination changes are subjected to moving average, or by accumulating a plurality of image sequence whereby an image to serve as a background is estimated through statistically processing the accumulated images.

SUMMARY OF THE INVENTION

In the former method, however, the averaging process must last over a long period of time so as to eliminate the influence from moving objects in an imaging environment where cars or people are always likely to appear. Moreover, in this case, even if an base image is obtained which is free from the influence by moving objects or which contains no moving object, the long-time data processing causes the base image to poorly follow up the change in illumination especially if it is slow. This may cause a "false positive".

In the latter case, as disclosed in JP-A-9-81714, video data must be accumulated over a long period of time to estimate an image to serve as a background which contains no moving object. This also may cause a problem of poor follow-up as in the previous case. Further, the problems in this case include the requirement of a large memory area for storing a huge amount of data and the cost for statistical processing of the huge amount of data.

This invention, which has been made in consideration of these problems, aims to provide a method, an apparatus and a video surveillance system for generating backgrounds free from moving objects such as cars or people thereby detecting with high precision such moving objects appearing in the backgrounds free from moving objects.

According to this invention which has been made to solve the problems mentioned above, there is provided an apparatus for generating a background formed by removing a moving object from an input image fetched by means of an image processing unit, the apparatus comprising:

a feature vector extractor for extracting a predetermined feature at an arbitrary position in the input image to calculate input feature vector;

an average processor for averaging the input feature vectors, calculating base feature vectors by suppressing the outliers contained in the input images, and generating a base image composed of the base feature vectors;

a data accumulator for accumulating the base feature vectors or the base images;

a statistical processor for estimating the central value from the time-sequential data representing the base feature vectors for arbitrary positions in the input image and accumulated in the data accumulator, and calculating the background feature vectors to generate the background composed of the background feature vectors.

According to this invention which has been made to solve the problems mentioned above, there is provided a method for generating a background formed by removing a moving object from an input image fetched by means of an image processing unit, the method comprising the steps of:

extracting a predetermined feature at an arbitrary position in the input image to calculate an input feature vector;

averaging the input feature vectors, calculating base feature vectors by suppressing the outliers contained in the input images, and generating a base image composed of the base feature vectors;

accumulating the base feature vectors or the base images;

estimating the central value from the time-sequential data representing the base feature vectors for arbitrary positions in the input image and accumulated in the data accumulator; and performing a statistical process to generate the background composed of the background feature vectors.

According to this invention which has been made to solve the problems mentioned above, there is provided a video surveillance system for detecting a moving object in a fetched image, the system comprising:

a feature vector extractor for extracting a predetermined feature at an arbitrary position in the input image to calculate an input feature vector;

an average processor for averaging the input feature vectors, calculating base feature vectors by suppressing the outliers contained in the input images, and generating a base image composed of the base feature vectors;

a data accumulator for accumulating the base feature vectors or the base images;

a statistical processor for estimating the central value from the time-sequential data representing the base feature vectors for arbitrary positions in the input image and accumulated in the data accumulator, and calculating the background feature vectors to generate the background composed of the background feature vectors.

According to this invention, the feature vectors from which the outliers are removed through averaging are accumulated, and the central value is calculated through statistically processing the time-sequential data thus accumulated, whereby the background depicting only the background scene and the still object can be obtained.

Further, as the feature vectors from which the outliers occurring for a predetermined period of time are removed through averaging process are accumulated, the amount of the time-sequential data to constitute the background can be decreased and also the time required to statistically process the time-sequential data can be reduced.

In addition to this, the generation of the background containing no moving objects can be realized while the number of frames required for statistical processing, the memory capacity and the processing cost are kept low.

Accordingly, as the background of high precision can be produced, such appearance objects as people or cars can be extracted and detected with high precision.

Other objects, features and advantages of the invention will become apparent from the following description of the embodiments of the invention taken in conjunction with the accompanying drawings.

DESCRIPTION OF THE EMBODIMENTS

This invention will now be described by way of embodiments with reference to the attached drawings.

Figure 1:
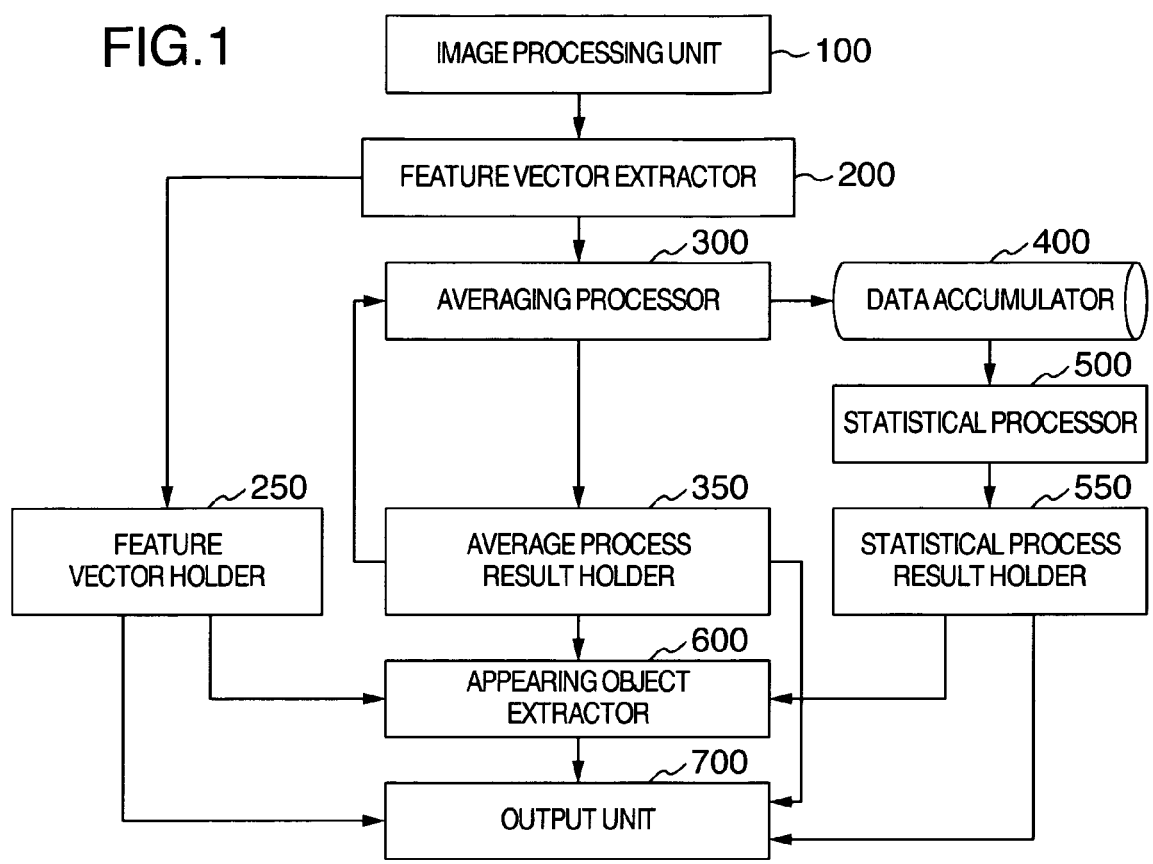
FIG. 1 is a block diagram showing the overall constitution of an embodiment of this invention.

FIG. 1 shows a general constitution of this invention applied to a video surveillance system which consists of an electronic computer system including CPUs as hardware that performs required functions respectively.

This surveillance system comprises an image processing unit 100 for acquiring background data from, for example, a video camera using CCD elements; a feature vector extractor 200 for extracting feature vectors from the data fetched by the image processing unit 100; a feature vector holder 250 for holding feature vectors calculated by means of the feature vector extractor 200; an average processor 300 for calculating a base image free from the effects of short-period noise and illumination change on the basis of both the feature vector calculated in the feature vector extractor 200 and the data stored in an average process result holder 350 for holding the processed result in the past; a data accumulator 400 for accumulating for a predetermined number of frames a series of time-sequential data which were produced by additively averaging the feature vectors calculated by means of the moving average processor 300; a statistical processor 500 for calculating a background by statistically processing the time-sequential data accumulated in the data accumulator 400; a statistical process result holder 550 for holding the result calculated by means of the statistical processor 500; an appearance object extractor 600 for extracting such an object as a man or a car that appears in the scene image by using data from the feature vector holder 250, the average process result holder 350 and the statistical process result holder 550; and an output unit 700 for outputting the result of the appearance object extractor 600 and the data held in the feature vector holder 250, the average process result holder 350 and the statistical process result holder 550.

The image processing unit 100 fetches image data in one or two-dimensional array from the video signal fed from a real-time operating video camera or a video signal recorder storing image data. These image data may be pre-processed by means of a smoothing filter or an edge filter or by being subjected to intensity conversion.

The feature vector extractor 200 extracts an arbitrary input feature vector from the image data acquired by means of the image processing unit 100. The input feature vector is calculated for each pixel in the image of interest and may be represented as a feature quantity calculated on the basis of any arbitrary operator such as the grey level, the RGB components of the color image, or the edge level magnifier calculated by means of the differential filter using Sobel operator. This input feature vector may also be represented as a feature derived from those operators integrated together. In this embodiment of the invention, the grey level is chosen for the input feature vector and its normalized versions ranging from 0 through 255 are used. The input feature vector calculated in this way is held in the feature vector holder 250.

Figure 2:
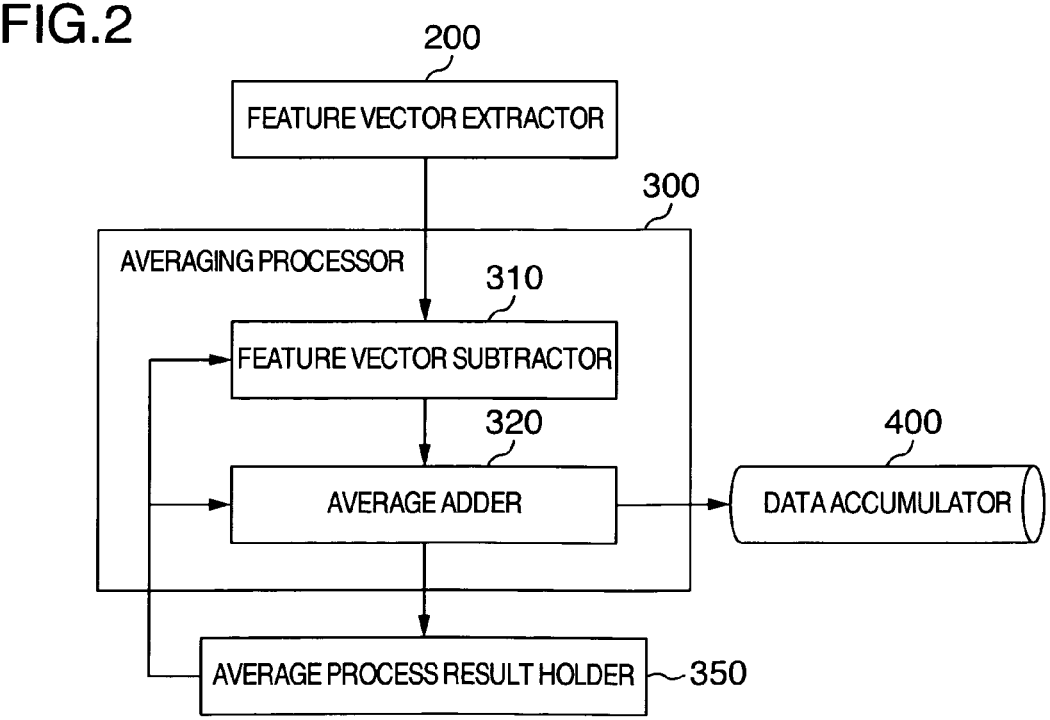
FIG. 2 is a block diagram showing an average processor for averaging feature vectors.

In order to derive an image depicting a background alone or a still object alone from the input feature vectors extracted by means of the feature vector extractor 200, the input feature vector must first be averaged along the time axis by means of the average processor 300 so as to suppress the influence by short-period noise, brightness change due to change in sun shine or illumination, or the appearance in the scene of a moving object. This process is described with reference to FIG. 2.

By using the input feature vector representative of the input image calculated per pixel by means of the feature vector extractor 200 and results of calculation made until the previous frame and held in the average process result holder 350, the base feature vector at time instant t of the base image is subjected to averaging according to the formula (1) given below.

$$B_t(p) = \alpha \times (B_{t-1}(p) - I_t(p)) + B_{t-1}(p), \quad (1)$$

where p represents the position of the pixel in the image, B the base feature vector, and I the input feature vector. This averaging process is performed on the selected feature and the entire pixels in an individual image for every input frame of the video signal. For simplicity, however, unless otherwise specified, such an process shall be understood as applied to a particular pixel at a pixel position p and a time instant t in the following description.

A feature vector subtractor 310 calculates the difference between the input feature vector I and the base feature vector B. An average adder 320 adds the resulted difference multiplied by a to the base feature vector B. The coefficient α in the formula (1) represents the weighting degree with respect to the input feature vector I. Therefore, the greater is the value of α, the greater is the influence of the change in the input feature vector I on the base feature vector B.

Figure 3:
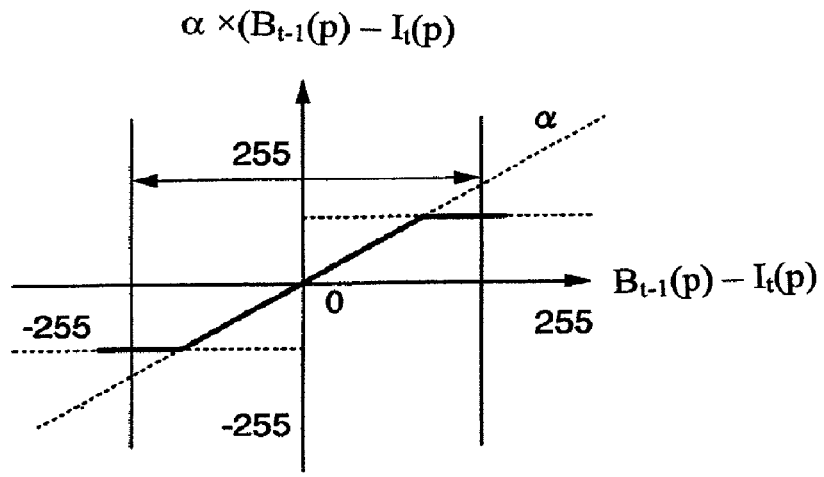
FIG. 3 is a graph showing an example of determining the coefficient α (alpha) used in the moving average processor shown in FIG. 2.

The value of α may be specified arbitrarily depending on the imaging condition. The value of α governs the time delay with which the base feature vector B comes to be influenced by the change in the input feature vector I corresponding to the halt of a moving object appearing in the scene or the change in the sun shine or illumination. The value of α is increased to decrease the time delay. In this embodiment, as shown in FIG. 3, the difference calculated by means of the feature vector subtractor 310 is limited at both ends, having the upper and lower limits. If the difference exceed the limits, then it is rendered to a fixed value so that the influence of an unusually large input feature vector B on the base feature vector I is suppressed.

The above described average process is applied to every pixel of an image to generate a corresponding base feature vector B. The generated base feature vector helps constitute a base image. The created base image is held in the average process result holder 350 so as to be used for processing the next frame. Base images for a predetermined number of frames are accumulated as time-sequential data in the data accumulator 400 so as to be used for generating a background later. The condition for the accumulation of the base images in the data accumulator 400 is such that they are accumulated only if the difference calculated by means of the feature vector subtractor 310 is not greater than a predetermined threshold value. This condition aims to secure the precision of the generated background by composing the time-sequential data only of such values of the input feature vector I as are other than its outliers which apparently reflect the influence by noise or moving objects.

Figure 4:
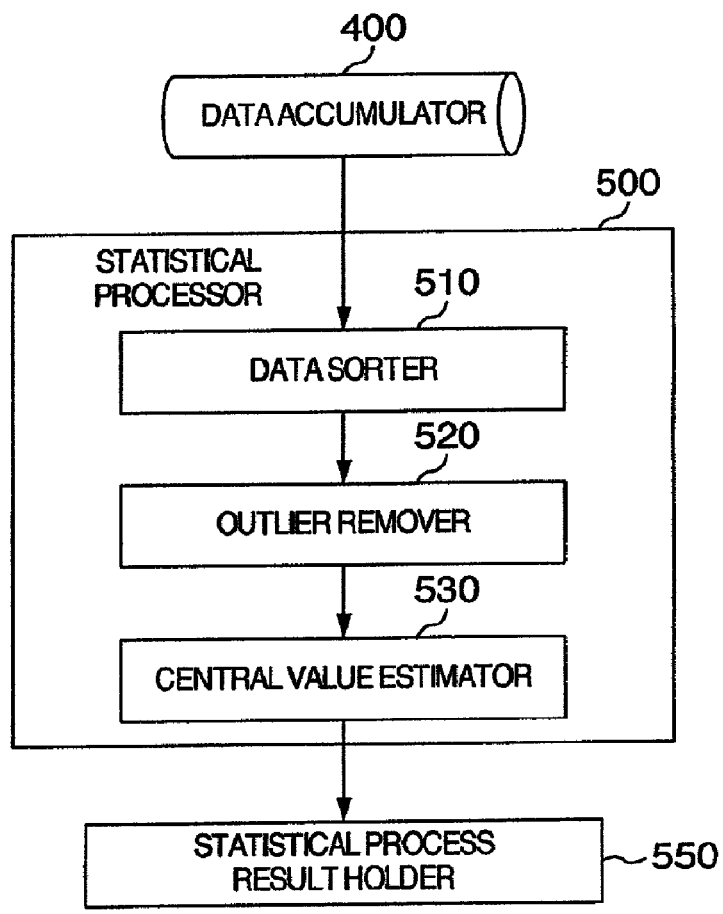
FIG. 4 is a block diagram showing a statistical processor for statistically calculating a central value from time-sequential data.
Figure 5:
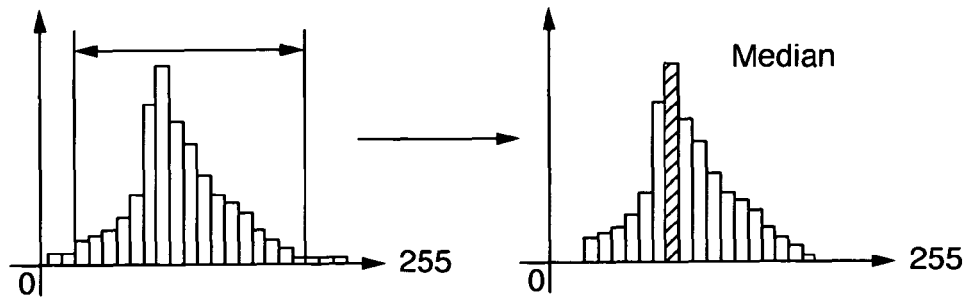
FIG. 5 is graphs showing how histograms are shifted through statistical processing in the statistical processor.

The time-sequential data representing the pixel at pixel location p, accumulated in the data accumulator 400 can be expressed as $B_N(p)=\{B_1(p), B_2(p), \Lambda B_N(p)\}$ if the number of frames to be accumulated is set to N. Although the time-sequential data $B_N(p)$ are composed of the base feature vectors B which the average processor 300 generates by additively averaging the outliers corresponding to the short-period noise or luminance variation, the influence by the outliers still remains in the time-sequential data $B_N(p)$. Then, a description is made with reference to FIGS. 4 and 5 of the process wherein background feature vectors S to constitute a background are formed of the time-sequential data $B_N(p)$ which contain the influence of the outliers that do not correspond to a background scene or still objects.

The statistical processor 500 statistically processes the time-sequential data $B_N(p)$ accumulated in the data accumulator 400 to produce the central value for the time-sequential data so that a background feature vector S is derived.

If an averaging method is employed to calculate the central value from the time-sequential data $B_N(p)$, the central value may possibly be affected to a certain extent by the outliers contained in the time-sequential data $B_N(p)$ Other methods of obtaining the central value include the M-estimation, the Least Medium Square (LMedS) Estimation, etc. In this embodiment, the simplest case is employed, that is, the median is chosen to be the central value. In this way, the median, which gives an occurring probability of ½, is to be obtained from among the time-sequential data $B_N(p)$. The histograms for the time-sequential data $B_N(p)$ must be constructed for this purpose. Such a histogram is constructed by arranging in an ascending or descending order the values of the feature vectors represented as the time-sequential data by means of a data sorter 510, the arranged values being represented by $B'_N(P)$. Another histogram is reconstructed by removing by means of an outlier remover 520 those values in this distribution which fall beyond the threshold values. The median $B'_{N/2}(p)$ is obtained from the reconstructed histogram by means of a central value estimator 530 and the obtained median is used as a background feature vector S as represented by the following formula (2).

$$S = \mathrm{med}\{B'(p)\} = B'_{N/2}(p) \tag{2}$$

This background feature vector S is then held in a statistical process result holder 550. The background is composed of the background feature vectors S each of which is calculated for each corresponding pixel.

According to the above described embodiment of this invention, the feature vectors whose outliers are removed through averaging are accumulated so that images depicting only background scenes and still objects may be generated. Consequently, the amount of required time-sequential data can be decreased and therefore the process time required for calculating the central value from the time-sequential data can be decreased, too.

Figure 6:
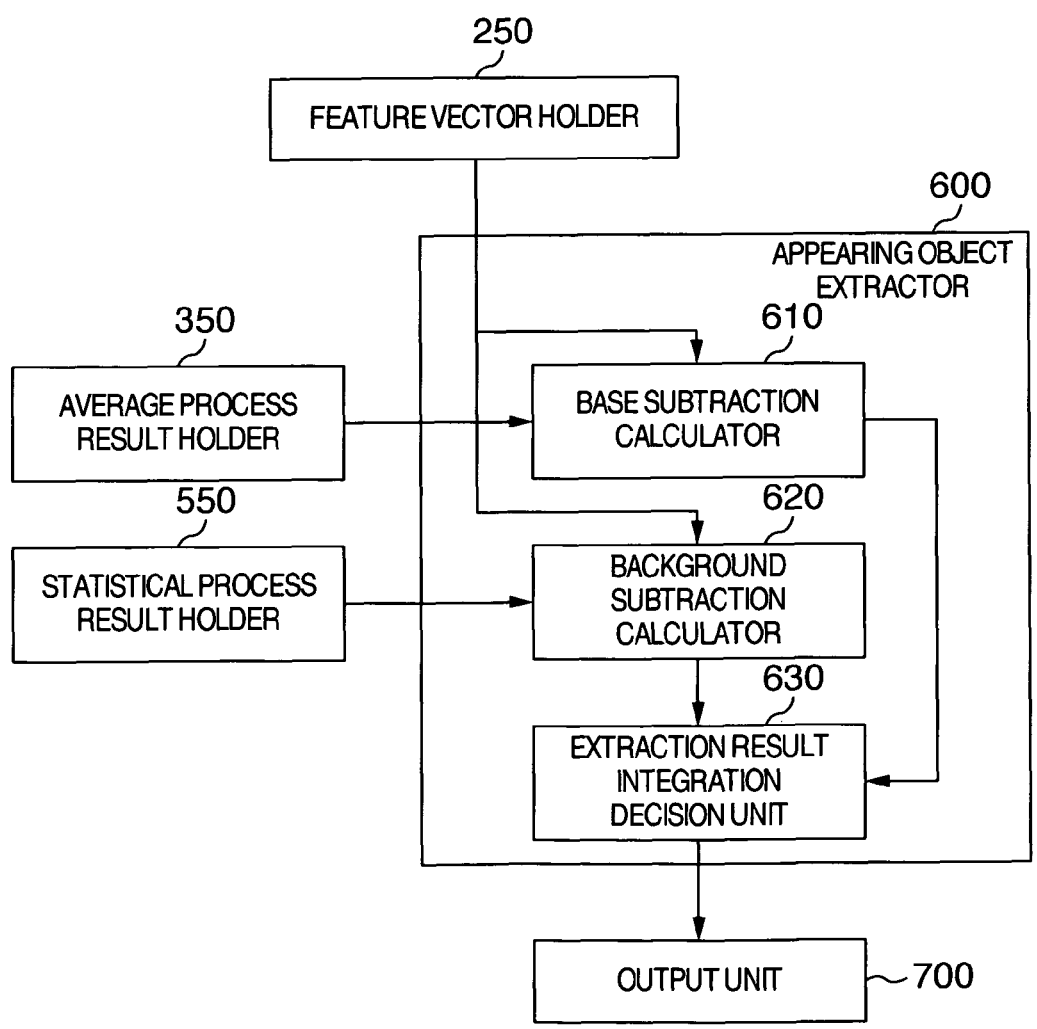
FIG. 6 is a block diagram showing an appearing object extractor for extracting an appearing object according to a moving object detecting process embodying this invention.

Now, the function of an appearing object extractor 600 is described with reference to FIG. 6. The appearing object extractor 600 extracts an object appearing in the scene on the basis of the input feature vector I, the base feature vector B and the background feature vector S stored in the feature vector holder 250, the average process result holder 350 and the statistical process result holder 550, respectively. A base subtraction calculator 610 calculates the difference between the input feature vector I and the base feature vector B, i.e. $\mathrm{Sub}_{B-1}=B_I(p)-I_I(p)$, and a background subtraction calculator 620 calculates the difference between the input feature vector I and the background feature vector S, i.e. $\mathrm{Sub}_{S-1}=S_I(p)-I_I(p)$.

An extraction result integration decision unit 630 judges the extracted results depending on the calculated differences. If $\mathrm{Sub}_{S-1}$ exceeds a predetermined threshold value, a decision is made that there is an appearance object. This kind of decision is made on all the pixels constituting an image and an appearance object is extracted by integrating the pixels that was deemed to correspond to a part of an appearance object.

An output unit 700 delivers the extracted result or result of judgment calculated by means of the appearance object extractor 600, the input feature vector I, the base feature vector B and the background feature vector S. Thus, the extracted result and the data representing the feature vectors can be ascertained by ascertaining the output data by means of a video output apparatus. It will also be possible to record or deliver the image containing a moving object or the image of a passing vehicle alone for vehicle detection through network event delivery or by delivering such images to an video input unit, using the appearance of a moving object as a trigger for delivery. Further, if the output data is combined with an alarm system, alarm signals can be started in response to the appearance of a suspicious intruder or the occurrence of a unlawful conduct.

In this embodiment, if $\mathrm{Sub}_{B-1}=0$ and $\mathrm{Sub}_{S-1}$ exceeds a predetermined fixed value, then judgment can be made that a moving object came to a halt. Moreover, if the base feature vectors B is prevented from being continually accumulated in the data accumulator 400, a still object can be continually observed. In addition, the time for which an object remained stationary can be counted by measuring the time for which the still condition lasted.

In this embodiment, the interval at which the base feature vectors B are accumulated in the data accumulator 400 is set equal to the frame interval but the interval may be arbitrarily determined depending on the input data rate. The interval at which the appearance object is extracted may be set unequal to the accumulating interval.

In this embodiment, it is also possible to particularly specify the feature vector which is to be subtracted from the input feature vector, as one of plural feature vectors defined in plural regions within an image, e.g. the base feature vector in region A, the background feature vector calculated from the time-sequential data accumulated over N frame periods in region B, and the background feature vector calculated from the time-sequential data accumulated over N/2 frame periods in region C.

In generating a background according to this invention, the feature vectors from which the outliers are removed through averaging are accumulated, and the central value is calculated through statistically processing the time-sequential data thus accumulated, whereby the background depicting only the background scene and the still object can be obtained. Further, as the feature vectors from which the outliers occurring for a predetermined period of time are removed through averaging process are accumulated, the amount of the time-sequential data to constitute the background can be decreased and also the time required to statistically process the time-sequential data can be reduced. In addition to this, as the background of high precision can be produced, such appearance objects as people or cars can be extracted with high precision.

Figure 7:
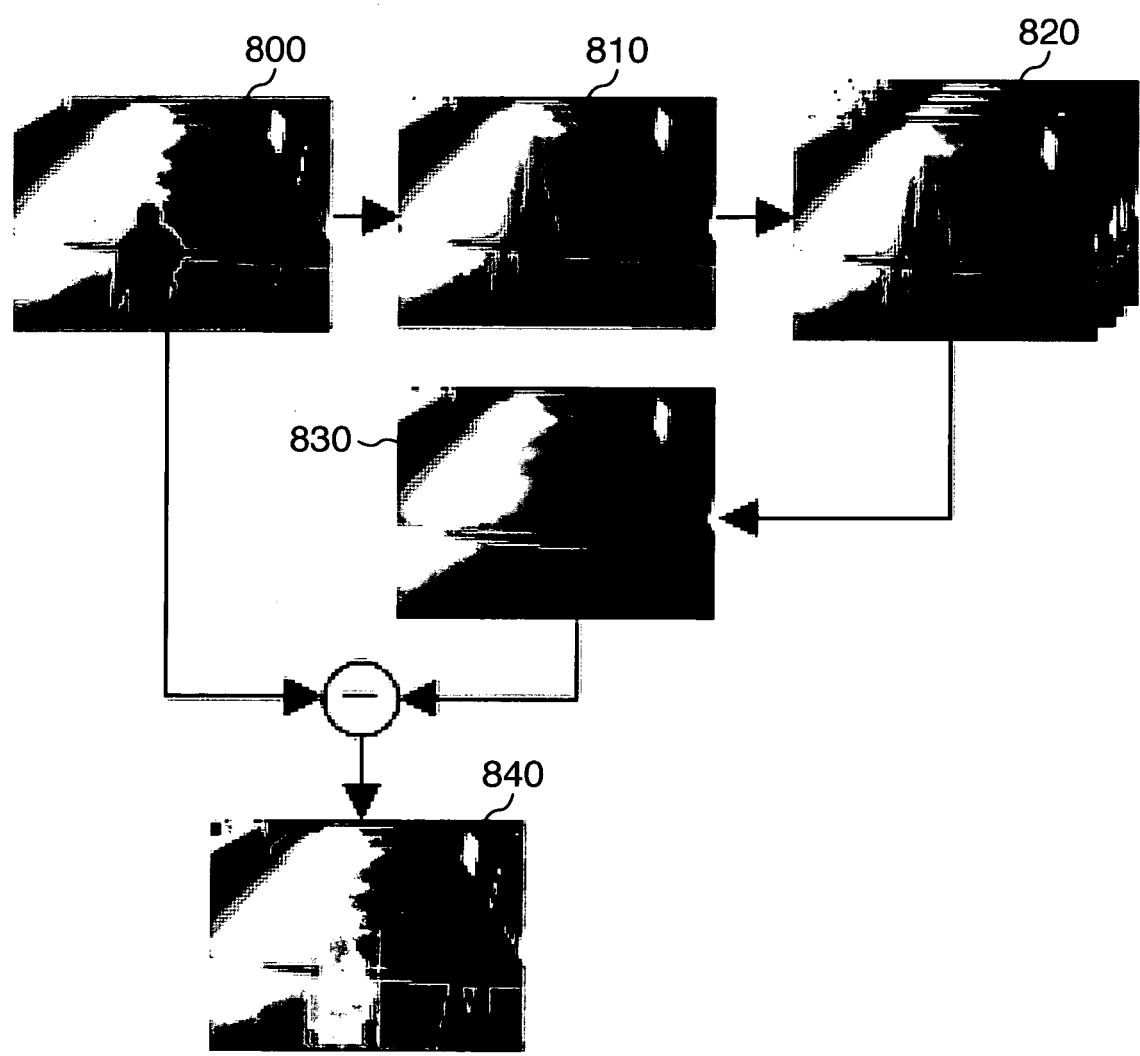
FIG. 7 is pictures showing a result of the moving object detection according to an embodiment of this invention.

FIG. 7 shows an example of the result obtained with this embodiment where the moving object detection process is applied to the indoor human detection.

An input image 800 is that which depicts the entrance hall of a certain building with a person entering the hall. This input image 800 is averaged as described above to produce an average process result image 810. An accumulated data image 820 made up of a plurality of such average process result images 810 is statistically processed to produce a statistical process result image 830. As shown in FIG. 7, a shade formed due to the movement of the person for a short period of time appears in the average process result image 810. On the other hand, the statistical process result image 830 has no shade of the person therein and depicts only the background of the entrance hall. The statistical process result image 830 defined as the background and the input image 800 are subjected to a subtraction process. As a result, an extraction result image 840 which detects the person can be obtained and it is observed that only the person moving through the entrance hall is extracted and that the person defined as a moving object can be detected with high precision.

As described above, this invention can provide a method and an apparatus and a video surveillance system using the method and the apparatus, for generating a background wherein an input image is used to detect a moving object or an appearance object with high precision. Accordingly, this invention makes it possible to extract such an appearance object as a person or a car with high precision even in such an image environment as security surveillance or intelligent transport system (ITS) where traffic flow is relatively heavy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A background generation apparatus for generating a background by removing a moving object from an input image acquired by means of an image processing unit, the apparatus comprising:
 a feature vector extractor for extracting predetermined features at arbitrary positions in the input image to calculate input feature vectors;
 an average processor for calculating an average of the input feature vectors, and calculating base feature vectors in which outliers contained in the input image are suppressed;
 a data accumulator for accumulating the base feature vectors;
 a statistical processor for estimating the central value from time-sequential data representing the base feature vectors at arbitrary positions accumulated in the data accumulator, and calculating background feature vectors that are used to generate the background; and
 an average process result holder for holding the base feature vectors calculated, wherein the average processor includes:
 a feature vector subtractor for calculating a difference between an input feature vector and past base feature vector held in the average process result holder; and
 an average adder for adding to the past base feature vector, the difference multiplied by a predetermined coefficient.

2. A background generation apparatus as claimed in claim 1, wherein the base feature vectors are accumulated in the data accumulator only when the difference is not greater than a predetermined threshold.

3. A background generation apparatus as claimed in claim 1, further comprising a statistical process result holder for holding the background feature vectors:
 wherein the statistical processor includes:
 a data sorter for sorting in a descending or ascending order the sequential data representing the base feature vectors accumulated in the data accumulator;
 an outlier remover for removing those outliers which fall outside a predetermined region in the distribution of the time-sequential data sorted by means of the data sorter;
 a central value estimator for calculating the central value from the time-sequential data from which the outliers have been removed, on the basis of the probability of occurrence of the base feature vectors constituting the time-sequential data, thereby calculating the background feature vector.

4. A background generation apparatus as claimed in claim 1, having an appearing object extractor comprising:
 a base subtraction calculator for calculating the base subtraction between the input feature vector and the base feature vector;
 a background subtraction calculator for calculating the background subtraction between the input feature vector and the background feature vector; and
 an extraction result integration decision unit for calculating extracted result from the base subtraction and the background subtraction.

5. A background generation apparatus as claimed in claim 4, wherein the extraction result integration decision unit passes a judgment that a moving object came to a halt only when a value of the base subtraction is not greater than a predetermined threshold and a value of the background subtraction is not smaller than a predetermined threshold.

6. A background generation apparatus as claimed in claim 5, wherein the stopped object is determined to be continuously stationary if the judgment of the object halting lasts for a predetermined number of frames.

7. A background generation apparatus as claimed in claim 1, wherein the frame rate at which the data is accumulated in the data accumulator is set arbitrary independent of the image processing rate.

8. A background generation apparatus as claimed in claim 1, wherein the feature vector subtractor is configured to set a upper limit and a lower limit to the difference, and, when the calculated difference exceeds the upper or lower limit, to output the upper limit or the lower limit as the difference, and wherein the average adder carries out calculation using the difference outputted from the feature vector subtractor.

9. A background generation method for generating a background by removing a moving object from an input image acquired by means of an image processing unit, the method comprising:
extracting predetermined features at arbitrary positions in the input image to calculate input feature vectors;
calculating an average of the input feature vectors, calculating base feature vectors in which the outliers contained in the input image are suppressed;
accumulating the base feature vectors;
performing statistical processing to calculate background feature vectors that are used for generating the background, by estimating the central value from time-sequential data representing the base feature vectors at arbitrary positions; and
holding the base feature vectors calculated;
wherein the calculating the average includes:
calculating the difference between an input feature vector and past base feature vector held in the holding operation; and
adding to the past base feature vector the difference multiplied by a predetermined coefficient.

10. A background generation method as claimed in claim 9, comprising:
accumulating the base feature vectors only when the difference is not greater than a predetermined threshold.

11. A background generation method as claimed in claim 9, comprising:
sorting in a descending or ascending order the time-sequential data representing the base feature vectors accumulated;
removing those outliers which fall outside a predetermined region in a distribution of the sorted time-sequential data;
calculating the central value from the sequential data from which the outliers have been removed, based on the probability of occurrence of the base feature vectors constituting the time-sequential data, thereby calculating a background feature vector; and
holding the background feature vector.

12. A background generation method as claimed in claim 9, comprising:
calculating the base subtraction between the input feature vector and the base feature vector;
calculating the background subtraction between the input feature vector and the background feature vector; and
calculating the extracted result from the base subtraction and the background subtraction.

13. A background generation method as claimed in claim 12, wherein the judgment that a moving object came to a halt is passed only when the base subtraction is not greater than a predetermined threshold and the background subtraction is not smaller than a predetermined threshold.

14. A background generation method as claimed in claim 13, wherein the stopped object is determined to be continuously stationary if the judgment of the object halting lasts for a predetermined number of frames.

15. A background generation method as claimed in claim 9, wherein the frame rate at which the base feature vectors are accumulated is set arbitrary independent of the image processing rate.

16. A background generation method as claimed in claim 9, wherein the feature vector subtractor is configured to set a upper limit and a lower limit to the difference, and, when the calculated difference exceeds the upper or lower limit, to output the upper limit or the lower limit as the difference, and
wherein the average adder carries out calculation using the difference outputted from the feature vector subtractor.

17. A video surveillance system for detecting a moving object from an input image, comprising:
a feature vector extractor for extracting predetermined features at arbitrary positions in the input image to calculate input feature vectors;
an average processor for calculating the average of the input feature vectors, and calculating base feature vectors in which the outliers contained in the input image have been suppressed;
a data accumulator for accumulating the base feature vectors therein;
a statistical processor for estimating the central value from the time-sequential data representing the base feature vectors at arbitrary positions in the input image and accumulated in the data accumulator, and calculating the background feature vectors that are used to generate a background; and
an average process result holder for holding the base feature vectors calculated, wherein the average processor includes:
a feature vector subtractor for calculating a difference between an input feature vector and past base feature vector held in the average process result holder; and
an average adder for adding to the past base feature vector the difference multiplied by a predetermined coefficient.

18. A video surveillance system as claimed in claim 17, wherein the data accumulator accumulates the base feature vectors only when the difference is not greater than a predetermined threshold.

19. A video surveillance system as claimed in claim 17, further comprising a statistical process result holder for holding the calculated base feature vectors,
wherein the statistical processor includes:
a data sorter for sorting in a descending or ascending order the time-sequential data representing the base feature vectors accumulated in the data accumulator;
an outlier remover for removing those outliers which fall outside a predetermined region in the distribution of the time-sequential data sorted by the data sorter;
a central value estimator for calculating the central value from the time-sequential data from which the outliers have been removed by the outlier remove, on the basis of the probability of occurrence of the base feature vectors constituting the time-sequential data, thereby calculating the background feature vector.

20. A video surveillance system as claimed in claim 17, having an appearing object extractor comprising:
a base subtraction calculator for calculating the base subtraction between the input feature vector and the base feature vector;
a background subtraction calculator for calculating the background subtraction between the input feature vector and the background feature vector; and
an extraction result integration decision unit for calculating the extracted result from the base subtraction and the background subtraction.

21. A video surveillance system as claimed in claim 20, wherein the extraction result integration decision unit passes a judgment that a moving object came to a halt only when a value of the base subtraction is not greater than a predetermined threshold and a value of the background subtraction is not smaller than a predetermined threshold.

22. A video surveillance system as claimed in claim 17, wherein the frame rate at which the data is accumulated in the data accumulator is set arbitrary independent of the image processing rate.

23. A video surveillance system as claimed in claim 17, wherein the feature vector subtractor is configured to set a upper limit and a lower limit to the difference, and, when the calculated difference exceeds the upper or lower limit, to output the upper limit or the lower limit as the difference, and wherein the average adder carries out calculation using the difference outputted from the feature vector subtractor.

* * * * *